April 23, 1968     S. C. DAHLSTROM     3,379,455
INDEPENDENT DIRIGIBLE WHEEL SUSPENSION
Filed June 1, 1966
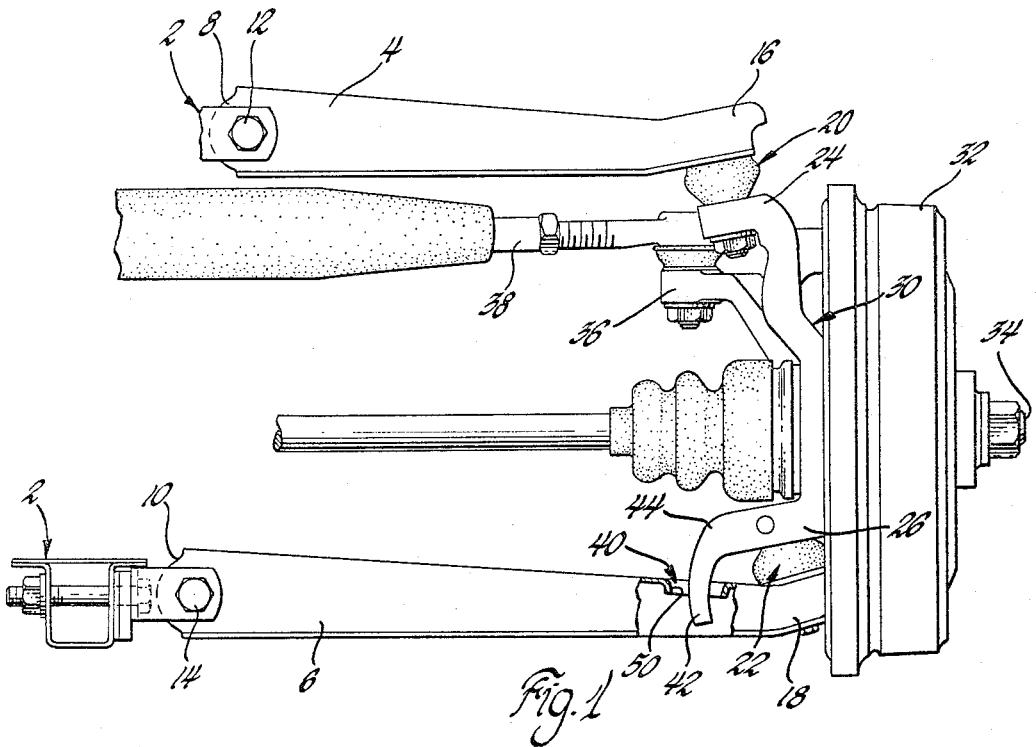
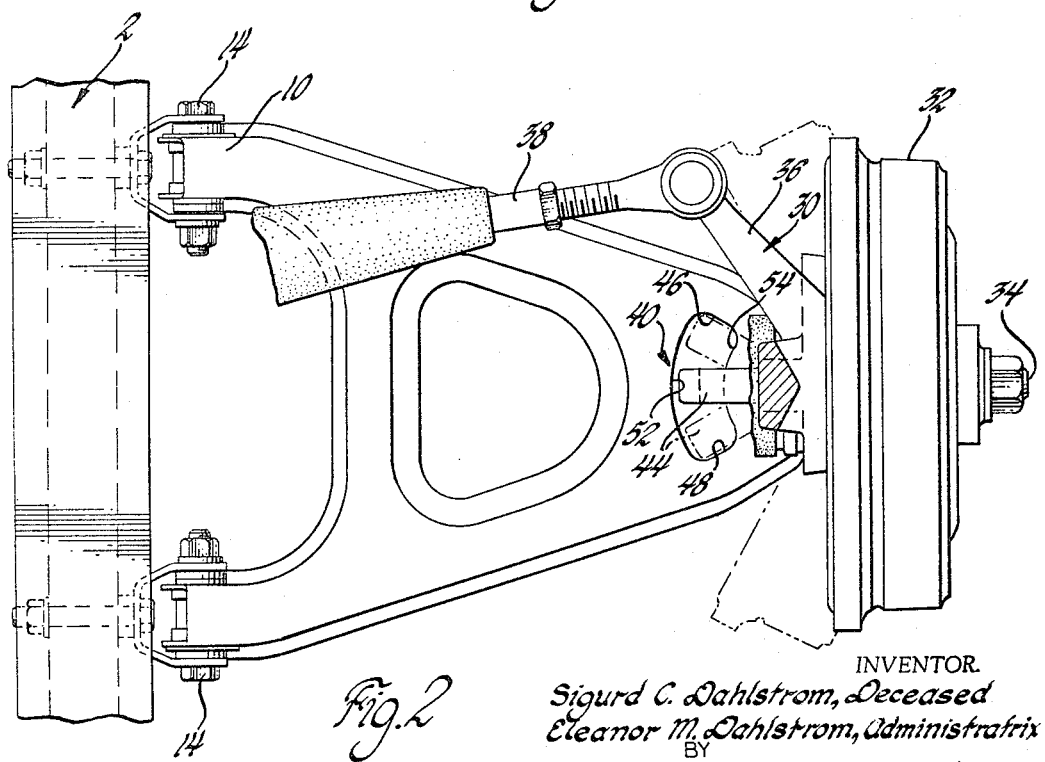
INVENTOR.
Sigurd C. Dahlstrom, Deceased
Eleanor M. Dahlstrom, Administratrix
BY
W. F. Wagner
ATTORNEY 3,379,455
INDEPENDENT DIRIGIBLE WHEEL SUSPENSION
Sigurd C. Dahlstrom, deceased, late of Detroit, Mich., by
Eleanor M. Dahlstrom, administratrix, Detroit, Mich.,
assignor to General Motors Corporation, Detroit,
Mich., a corporation of Delaware
Filed June 1, 1966, Ser. No. 554,599
6 Claims. (Cl. 280—89)

This invention relates to vehicle wheel suspension and more particularly to independent dirigible wheel suspension and steering linkage.

The present invention is concerned with providing an independent dirigible wheel suspension incorporating improved and simplified means for establishing and maintaining the dirigible limits of movement of the wheels.

According to the general features of the invention, there is provided an independent suspension linkage in which the wheel knuckle is provided with an element which projects into an opening formed in one of the wheel control arms, the opening being so formed and arranged as to allow the element projecting therein to move angularly with the steering knuckle as the latter describes the dirigible range of movement of the wheel, the opposite end extremities of the cut-out being located so as to establish a predetermined angular limit of dirigible movement of the wheel in each direction.

The foregoing and other objects, advantages and features of the invention will become more readily apparent as reference is had to the accompanying specification and drawing wherein:

FIGURE 1 is a rear end elevational view of an independent front suspension and steering linkage incorporating the invention; and FIGURE 2 is a partially sectioned plan view of the construction shown in FIGURE 1.

Referring now to the drawing and particularly FIGURE 1, there is shown a front wheel independent suspension linkage wherein the reference numeral 2 generally designates a vehicle frame or superstructure. A pair of vertically spaced transversely extending wishbone type wheel control arms 4 and 6 are connected at their respective inner ends 8 and 10 to superstructure 2 by means of conventional pivot connections 12 and 14, which in the illustrated embodiment extend generally parallel with the ground and in slightly offset lateral relation. At their respective outer ends 16 and 18, arms 4 and 6 have attached thereto upper and lower ball joint assemblies 20 and 22 which in turn are connected to the upper and lower ends 24 and 26 of a generally vertically extending wheel spindle support 30 to permit dirigible movement of the vehicle wheel, not shown, rotatably mounted with brake drum assembly 32 on wheel spindle 34. It will be understood that any suitable elastic medium, not shown, may be arranged in any conventional manner between either arm 4 or 6 and the vehicle superstructure 2 to effect resilient support of the latter relative to the wheel.

As seen best in FIGURE 2, wheel spindle support 30 includes an integral diagonally forwardly projecting steering arm 36 which pivotally engages a steering link 38 extending transversely inwardly of the vehicle for connection, in a conventional manner, to a steering gear assembly, not shown, through the medium of which the vehicle operator controls the dirigible angle of the wheels.

According to the principal feature of the invention, there is provided means for controlling the maximum steering angle of the wheel induced by operation of the conventional steering mechanism. According to the invention, the lower control arm 6 is a generally triangular sheet metal member having an arcuate cut-out portion 40 formed near the outer end thereof in which is received the depending extremity 42 of a finger like projection 44 formed integrally on spindle support 30. Arcuate portion 40 is aligned with respect to the projection 44 so that the latter occupies a position longitudinally midway between the longitudinal extremities 46 and 48 of the cut-out when the wheel is in the normal straight ahead position. Upon actuation of the steering mechanism in either direction, the projection 44 moves angularly with spindle 30 about the generally vertical axis defined by ball joints 20 and 22 with the result that continuous steering effort in one direction causes the extremity 42 of finger 44 to ultimately engage one or the other of the extremities 46 and 48 of cut-out 40 and arrest further dirigible movement of the wheel. In order to enhance reliability and durability of the steering limit stops thus produced, the arcuate cut-out 40 is preferably formed with a depending perimetrical flange 50 which increases the area of surface contact when the extremity 42 of finger 44 is in engagement with either of the extremities 46 or 48. In addition, since vertical deflection of the vehicle wheel incident to normal vehicle operation induces relative angular change between the major axes of knuckle 30 and arm 6, extremity 42 of finger 44 is preferably generated in a curved path as seen in end elevation which maintains a uniform clearance between the extremity 42 and the laterally opposite arcuate edges 52 and 54 throughout the normal vertical range of deflection of the linkage either above or below the normal static load position illustrated.

When constructed and arranged in the manner described, the invention provides a simple, inexpensive and reliable means for establishing and maintaining the desired range of dirigible movement of the vehicle wheels. It is to be particularly noted that a construction according to the invention enables establishment of effective limiting stops which are located in extremely close proximity to the axis of motion involved in dirigible movement of the wheel and thus reduce significantly the possibility of damage resulting to the steering mechanism in the event of road induced rapid angular movement of the wheels to the limits of movement.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. Dirigible wheel suspension linkage for a vehicle comprising, a pair of vertically spaced generally transversely extending control arms pivotally connected at their inboard ends to said vehicle, a wheel spindle support extending vertically between and universally pivotally connected at its opposite ends to the outward ends of said control arms, means forming a cut-out portion near the outboard end of one of said arms, and projecting means on said spindle extending into said cut out and arcuately movable therein responsive to dirigible movement of said wheel, said cut-out being formed with extremities engageable by said projection means defining the limits of dirigible movement of said wheel.

2. The structure set forth in claim 1 wherein the said one of said arms is formed of sheet metal and said cut-out portion is bounded by a perimetrical flange formed from said sheet metal.

3. The structure set forth in claim 2 wherein said projecting means is integral with said spindle.

4. The structure set forth in claim 3 wherein said cut-out portion extends vertically through said arm.

5. The structure set forth in claim 4 wherein said cut-out portion defines an arc corresponding to the arcuate path of said projecting means.

6. The structure set forth in claim 5 wherein said projecting means extends inwardly from the major axis of said spindle and downwardly through said cut-out.

References Cited

UNITED STATES PATENTS

| | | | |
|---|---|---|---|
| 759,090 | 5/1904 | Garner | 280—89 |
| 2,159,644 | 5/1939 | Woida | 280—89 |

RICHARD J. JOHNSON, *Primary Examiner.*

P. GOODMAN, *Assistant Examiner.*